United States Patent
Seko et al.

[15] 3,673,068
[45] June 27, 1972

[54] PROCESS FOR RECOVERING WASTE ACIDS AND METALS BY ELECTRODIALYSIS

[72] Inventors: Maomi Seko, Tokyo; Akira Yomiyama, Nobeoka-shi; Tetsuya Miyake, Nobeoka-shi; Hidemaro Iwashita, Nobeoka-shi, all of Japan

[73] Assignee: Asahi Kasei Kogyo Kabushiki Kaisha, Kita-ku, Osaka, Japan

[22] Filed: Dec. 12, 1969

[21] Appl. No.: 884,555

[30] Foreign Application Priority Data

Dec. 16, 1968 Japan..................................43/91560

[52] U.S. Cl..............................................204/180 P
[51] Int. Cl................................................B01d 13/02
[58] Field of Search .................204/180 P, 301, 128, 130

[56] References Cited

UNITED STATES PATENTS

| | | | |
|---|---|---|---|
| 2,860,091 | 11/1958 | Rosenberg | 204/138 |
| 2,860,095 | 11/1958 | Katz et al | 204/180 P |
| 2,865,822 | 12/1958 | Murphy | 204/72 |
| 3,136,710 | 6/1964 | Dubey | 204/180 P |
| 3,239,442 | 3/1966 | Tirrell | 204/180 P |
| 3,318,788 | 5/1967 | Mintz | 204/130 |

FOREIGN PATENTS OR APPLICATIONS 857,688 1/1961 Great Britain......................204/180 P

OTHER PUBLICATIONS

Mason et al., " Applications of Ion Exchange Membranes in Electrodialysis," American Institute of Chemical Engin., Baltimore Meeting, (1957) or Chem. Eng. Progress, Vol. 53, No. 12, (1957) pp. 606–612
Wilson, " Demineralization by Electrodialysis," (1960), TD 433, P 7 C.2 pp. 36–43

Primary Examiner—John H. Mack
Assistant Examiner—A. C. Prescott
Attorney—Flynn & Frishauf

[57] ABSTRACT

A process for recovering a substantial portion of nitric acid and metal ions from an acidic waste liquid produced in the process for the production of adipic acid by oxidizing cyclohexanone or cyclohexanol in a liquid phase, which comprises supplying said waste liquid to an electrodialysis apparatus including one or more electrodializers to recover said nitric acid and metal ions in a recovering liquid of a member selected from water and a diluted aqueous nitric acid.

5 Claims, 4 Drawing Figures

PROCESS FOR RECOVERING WASTE ACIDS AND METALS BY ELECTRODIALYSIS

BACKGROUND OF THE INVENTION

1. Field of the Invention

This invention relates to a process for recovering acids and metal ions from waste liquids produced in chemical plants by employing an electrodialysis technique and apparatus. More particularly, this invention relates to a process for recovering a substantial portion of nitric acid and metals from a waste liquid produced in a process for the production of adipic acid by oxidizing cyclohexanone or cyclohexanol with nitric acid in a liquid phase.

2. Description of the Prior Art

In general, in the process for oxidizing cyclohexanone or cyclohexanol with an aqueous solution of a concentrated nitric acid in the presence of a metal oxide catalyst, a mother liquid from which adipic acid has been separated in the form of crystals normally contains various types of carboxylic acids produced by oxidative decomposition of the starting material, in addition to excess nitric acid and metal ions used as a catalyst.

These carboxylic acids referred to above include monobasic acids such as formic acid and acetic acid; and dibasic acids such as oxalic, succinic, glutaric and adipic acids. Thus, in view of the material balance of the system, it becomes necessary that these acids be separated from nitric acid and metal ions and discharged out of the system.

A prior process known heretofore, for example, employs an apparatus as illustrated in FIG. 2 of the accompanying drawings and it comprises concentrating a waste liquid 33 by evaporating a substantial portion of nitric acid and water in evaporators 30, 31, adjusting the concentration of the resulting concentrate with water 37, passing the resulting dilute solution 34 through an ion exchange column 32 which is packed with a cation exchange resin to adsorb metal ions contained in the solution on the ion exchange resin, washing the resin with water 35 and passing a concentrated nitric acid through the column thereby regenerating and recovering the metal ions adsorbed on the resin.

In this operation, however, the concentration of nitric acid in the waste liquid supplied to the ion-exchange column must be kept under 1.0% by weight, since it is absolutely necessary that the concentration of nitric acid be lowered to within the range in which carboxylic acids present in the liquid are not dissociated in order to transfer the equilibrium of the cation exchange resin sufficiently to a metal side.

Accordingly, in the prior art process, it has been necessary that water in the waste liquid be substantially completely removed therefrom in the evaporators 30, 31 with consequential deposition of scale of metal salts of carboxylic acids on the heat transferring surfaces of the evaporators, and washing in order to remove scale must be carried out several times a day, which results in interrupting continuous operation. It has also been necessary that all of the piping system for the concentrated liquid be washed with water and diluted nitric acid at least once a month.

SUMMARY OF THE INVENTION

An object of the present invention resides in the provision of a novel process for recovering waste acids and metals from waste liquids, without being accompanied by drawbacks of the prior art process mentioned above.

Figure 2:
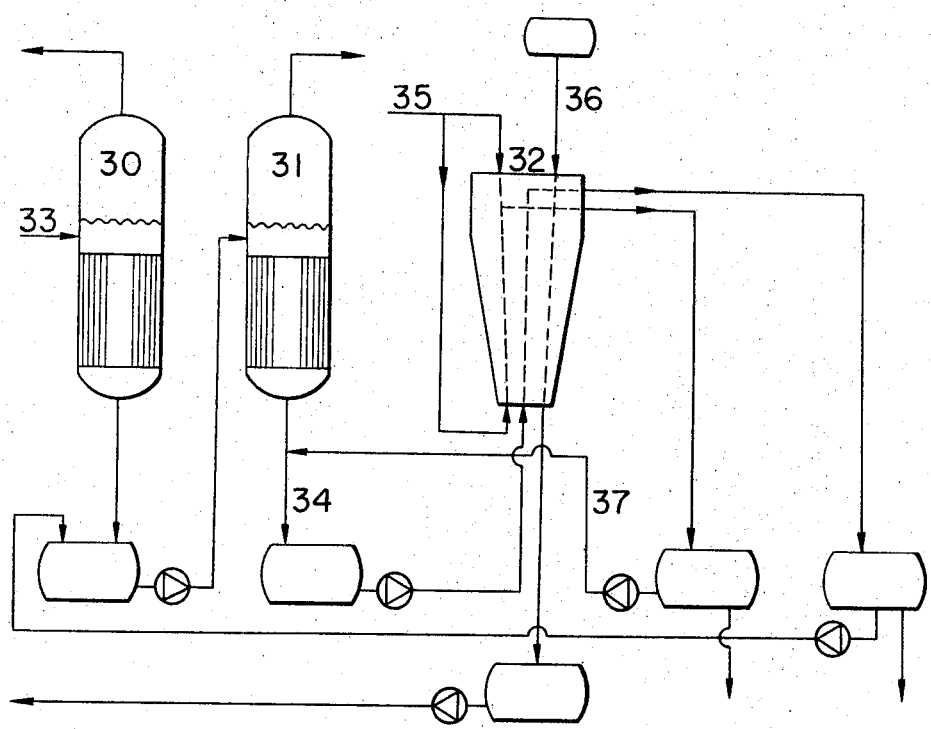
FIG. 2 shows an example used in the prior art processes.

Another object of the present invention resides in the complete elimination of difficulty in operation encountered in the prior art process by the application of the electrodialysis technique with which the recovering step of the prior art process as illustrated in FIG. 2 of the accompanying drawing is replaced by one or more electrodialysis apparatus.

Still another object of the present invention resides in the provision of a commercially advantageous process for recovering nitric acid and metal ions from a nitric acid-containing waste liquid produced in the process for the production of adipic acid by oxidizing cyclohexanone or cyclohexanol in a liquid phase, enabling the use of the recovered solution in the subsequent oxidation reaction of cyclohexanone or cyclohexanol with nitric acid.

Other attendant objects and advantages of the present invention will become apparent from the following description of this specification.

Now, the summary of the process of the present invention will be explained with reference to FIG. 1.

Figure 1:
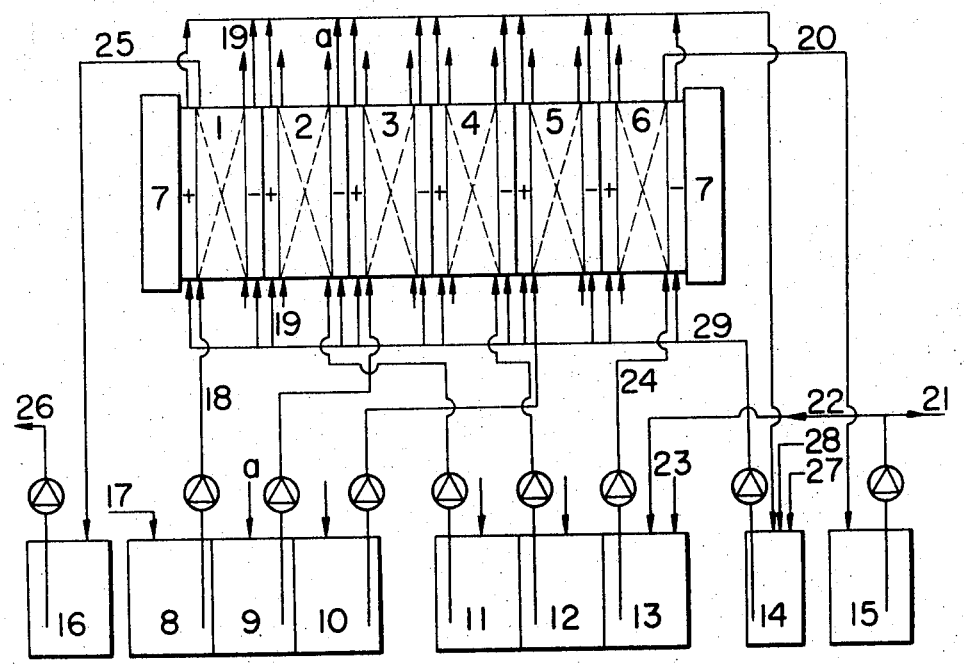
FIG. 1 illustrates an example of the apparatus suitable for embodying the present invention.

In FIG. 1, numerals 1, 2, 3, 4, 5 and 6 designate an electrodializer, respectively, and in this case these six electrodializers are fastened together by a hydraulic press 7. Numeral 8 designates a reservoir tank for a waste mother liquid 17 discharged from the oxidation process, and numerals 9 and 10 designate intermediary tanks. Numeral 13 refers to a reservoir tank for a recovering liquid, and 11 and 12 refer to intermediary tanks for recovered liquids which are contacted with a waste liquid through an ion exchange membrane disposed therebetween. Numeral 16 designates a reservoir tank for a concentrated recovered liquid 25 discharged from the first step electrodializer. Numeral 14 designates a reservoir/adjusting tank for an electrolyte respectively supplied to electrode chambers of each electrodializer. The electrolyte which is prepared mainly from sulfuric acid 27 and water 28 is supplied to electrode chambers of each electrodializer in pallarel. The electrolytes leaving the electrode chambers are recycled for reuse by replenishing freshly sulfuric acid and water, while a part thereof is discarded.

The waste mother liquid 17 discharged from the oxidation process is supplied to the first-stage electrodializer 1 through the reservoir tank 8 via line 18. In the electrodializer, a part of nitric acid and metal ions contained in the waste liquid is transferred through an ion exchange membrane to the adjoining recovering liquid and the waste liquid thus having been diluted is discharged from the electrodializer 1 via line 1. The diluted waste liquid is subsequently supplied to the second-stage electrodializer 2 via line 19 and, after having been further diluted in the same manner as in the first-stage electrodializer, the diluted waste liquid is fed to the intermediary tank 9 via line a—a. By following the same sequence as described above thereafter, the waste liquid is diluted to a predetermined concentration during the passage through one or more electrodializers, and the final waste liquid is discarded via tank 15 for the final waste liquid through line 21, while a part thereof is utilized for adjusting the concentration of the recovering liquid in the reservoir tank 13 by feeding the same via line 22. The recovering liquid is prepared mainly from water 23 and a small amount of diluted nitric acid 22 and it is fed into the final-stage electrodializer via line 24 so as to be contacted with the waste mother liquid countercurrently.

Thus, a substantial portion of nitric acid and metal ions contained in the waste mother liquid is transferred to the recovering liquid and the resulting recovered liquid thus obtained is once stored in the reservoir tank 16 and then recycled to the subsequent oxidation process via line 26.

In the prior art process as illustrated in FIG. 2 of the accompanying drawings, there is necessity of adjusting the concentration of recovered liquid and discharging excess water out of the system in view of material balance of the system. Thus, to accomplish this, there are specifically provided the evaporators 30, 31 for treating recovered liquid obtained from the ion-exchange column.

However, in the process of the present invention, since it is possible to concentrate the recovered liquid to a concentration about the same as or higher than that of the concentrated recovered liquid in the prior art process referred to above, there is no particular need for providing an evaporator, or, even if there is the need, one having a quite small capacity suffices for the purpose.

The electrodialysis apparatus illustrated in FIG. 1 is an embodiment of the process of the present invention and the number of stages of the electrodializer, the direction of liquid flow, the method of supplying electrolyte, etc. can be modified depending upon the performance of the electrodialysis apparatus employed, i.e. the electric current density, effective area of the membrane, the desalting ability, number of pairs of membranes, withstand cell voltage, etc.

However, since a waste mother liquid discharged from the oxidation process normally contains about 30 percent by weight of nitric acid, it is not desirable from the industrial standpoint to remove the nitric acid in a single-stage electrodialysis.

In general, due to the fact that the limiting current density which may be imposed on an electrodializer depends upon the concentration of a waste liquid at the exit of the electrodializer, it is quite difficult to employ a current density of higher than $5.0 A/dm^2$ when attempting to reduce the concentration of nitric acid to lower than 1.0% by weight.

However, by the adoption of a method in which six electrodializers are arranged in series and the concentration of a waste liquid is gradually reduced stepwise as shown in FIG. 1, it is possible to employ a quite high overall average current density by suitably selecting the current densities in the first through sixth electrodializers depending upon the concentration at each respective stages. In addition, the total effective area of the membranes may be reduced in reverse proportion to the average current density.

When employing multiple stages of electrodializers as described above, it is possible to replace a part thereof by a diffusion dializer. In other words, when recovering nitric acid and metal ions from a high acidic waste liquid having a high concentration, if water or a dilute nitric acid is used as a recovering liquid, acids and metal ions contained in the waste liquid can be transferred to the recovering liquid side by employing a conventional neutral diaphragm, due to the difference in concentrations between the waste liquid and the recovering liquid.

Figure 3:
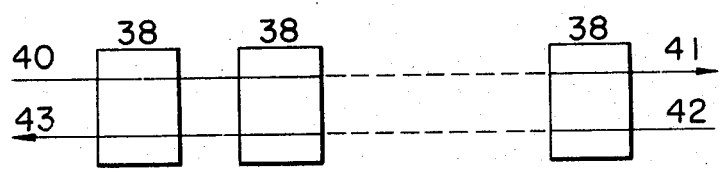
FIG. 3 illustrates an embodiment of the process flow of the present invention employing multiple stages of electrodializers.

FIG. 3 schematically illustrates a method of contacting a waste liquid countercurrently with a recovering liquid in a process employing multiple stages of the electrodializers as shown in FIG. 1.

Figure 4:
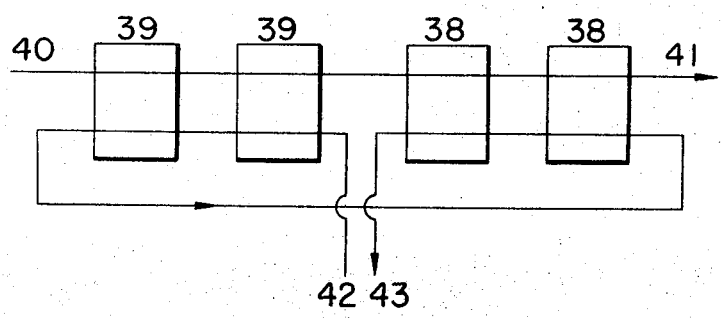
FIG. 4 shows another embodiment of the process flow of the present invention employing a combination of the electrodializer and the diffusion dializer.

FIG. 4 shows a modification of the arrangement illustrated in FIG. 3 in which a plurality of the electrodializers in younger stages are replaced by the diffusion dializers. For further clarification, in FIGS. 3 and 4, numeral 38 designates an electrodializer, 39 designates a diffusion dializer, 40 designates a waste liquid supplied to the system and 41 shows a waste liquid discharged from the system. Numerals 42 and 43 designate a recovering liquid supplied and a recovered liquid discharged, respectively.

When recovery is attempted in a system employing diffusion dializers as illustrated in FIG. 4, by the adoption of a method in which first a recovering liquid of a low concentration is contacted with a waste mother liquid of a high concentration through a separating membrane disposed therebetween to recover a substantial portion of nitric acid and metal ions from the waste mother liquid, and then these waste liquid and recovered liquid are further concentrated in an electrodializer, the electric power for electrodialysis can be greatly reduced and it is quite advantageous from the commercial standpoint. In actual practice, the waste liquid and the recovered liquid obtained in the diffusion dialysis process mentioned above are used as the starting waste mother liquid 17 and the starting recovering liquid 24, respectively, in the electrodialysis process as illustrated in FIG. 1.

There is an attendant advantage in the diffusion dialysis process in that an in expensive neutral diaphragm may be used instead of a relatively expensive ion exchange membrane.

Needless to say, in the present invention, the manner in which the recovering liquid is supplied is not restricted to that specifically illustrated in FIG. 4 and it can be modified depending upon needs, for example, the recovering liquid may be supplied independently to each respective diffusion dializer and electrodializer.

In the process of the present invention, an electrodialysis apparatus of any type having a construction in which a plurality of cation exchange membranes and anion exchange membranes are arranged alternately in pallarel and fastened together by a pair of a positive and a negative electrodes disposed at the both ends, and capable of concentrating or desalting an electrolyte by the imposition of a direct current, can be conveniently employed. The electrodializer of the type as referred to above has advantages in that it can be operated with a relatively less power consumption and can be constructed to accommodate a big capacity.

DESCRIPTION OF PREFERRED EMBODIMENTS

The present invention will be explained more in detail in the following Examples. It should not be construed, however, that these Examples will restrict the scope of the present invention as they are given merely by way of illustration:

EXAMPLE 1

Through an electrodialysis apparatus comprising six stages of electrodializers each including four pairs of membranes, each of these membranes having a current-conductive area of 20mm. width by 500mm. length, were passed 16kg. of a waste liquid having a composition including 484g. of nitric acid, 109g. of carboxylic acids, 6.1g. of copper and 1.3g. of vanadium per 1000g. of water at a rate of 8 liters per an hour with the imposition of a direct current at various current densities in respective stages as shown in the following Table 1, which also shows the concentrations of nitric acid in the treated waste liquid and the recovered liquid in each stage:

TABLE 1

| Stage No. | Electric current (A) | Concentration of nitric acid in the treated waste liquid (g/1000g. water) | Concentration of nitric acid in recovered liquid (g/1000g. water) |
| --- | --- | --- | --- |
| 1 | 78 | 253 | 241 |
| 2 | 41 | 133 | 135 |
| 3 | 21 | 69 | 72 |
| 4 | 11 | 36 | 40 |
| 5 | 5.9 | 18.8 | 23 |
| 6 | 3.1 | 9.9 | 14.5 |

The volume of the recovered liquid obtained was about 2 times more than the waste liquid originally supplied. The amounts of carboxylic acid, copper and vanadium ions transferred from the waste liquid to the recovered liquid were 98g., 52g. and 10g., respectively.

The electrodializer employed in the instant Example was of a construction in which a rubber gasket of 0.75mm. thickness, a cation exchange membrane and an anion exchange membrane were placed alternately to form a unit pair with the insertion of a polyethylene net-like spacer between these membranes for the purpose of preventing contact of the current-conductive surfaces with each other and also providing the liquid with an agitating effect, and a pair of electrode frames were disposed at both ends of the series of unit pairs to fasten them together.

The cation exchange membrane employed measuring 50mm. by 600mm. and 0.22mm. in thickness, having an average electro-conductivity of $3.1\Omega \cdot cm^2$ as measured in a 0.5N aqueous sodium chloride, was prepared by sulfonating a styrene/butadiene/divinylbenzene copolymer with sulfuric anhydride.

The anion exchange membrane used, having the same dimensions as the cation exchange membrane referred to above and having an average electroconductivity of 2.5Ω·cm² as measured in a 0.5N aqueous sodium chloride, was prepared by treating the same copolymer as referred to above with dichloroethane and subsequently with triethylamine.

EXAMPLE 2

Through a four-stage diffusion dializer each including 12 pairs of membranes, each of these membranes having a contacting area of 20mm. by 500mm., were passed 16kg. of an acidic waste liquid having the same composition as that of the waste liquid used in Example 1 at a rate of 8 liters per an hour, while supplying water as a recovering liquid countercurrently to the adjoining cell at a rate of 16 liters per an hour, and there obtained an acidic waste liquid containing 4.6 percent by weight of nitric acid from the fourth stage dializer.

The liquid thus obtained was supplied in series to a three-stage electrodializer having the same construction as described in Example 1 and the desalting operation was carried out under the conditions as shown in the following Table 2. As a result, the concentration of nitric acid could be reduced to 1.02% by weight. At this time, an aqueous nitric acid discharged from the diffusion dializer was recycled and reused as a recovering liquid.

TABLE 2

| Stage Nos. | Type of dialysis | Elec. current (A) | Concentration of nitric acid in the treated waste liquid (g./1000g.water) | Concentration of nitric acid in recovering liquid (g./1000g.water) |
| --- | --- | --- | --- | --- |
| 1 | Diffusion | — | — | 220 |
| 4 | Diffusion | — | 46.6 | — |
| 5 | Electro- | 6.7 | 28.0 | 238 |
| 6 | -do- | 4.0 | 16.8 | 229 |
| 7 | -do- | 2.4 | 10.2 | 223 |

The amounts of carboxylic acid, copper and vanadium ions transferred from the waste liquid to the recovered liquid were 220g., 48g. and 8.2g., respectively.

The electrodializers used in the instant Example were the same as one used in Example 1, and the diffusion dializers used were modified version of electrodializers in which the cation and anion exchange membranes were replaced by a commercially available parchment paper of 0.13mm. thickness.

What is claimed is:

1. A process for recovering nitric acid and metal ions from an acidic waste liquid produced in a process for the production of adipic acid by oxidizing cyclohexanone or cyclohexanol in a liquid phase employing multiple stages of electrodializers characterized in that a part of said electrodializers being replaced by one or more diffusion dializers and said recovering process comprises supplying said waste liquid and a recovering liquid of a member selected from water and a diluted aqueous nitric acid to said diffusion dializer thereby recovering a substantial portion of said nitric acid and said metal ions from said waste liquid and subsequently subjecting the resultant waste liquid further to an electrodialysis for recovering said nitric acid and said metal ions therefrom.

2. A process according to claim 1 wherein said waste liquid and said recovering liquid obtained in said diffusion dialysis are used as a starting waste liquid and a starting recovering liquid, respectively, in an electrodialysis.

3. A process according to claim 1 wherein said diffusion dialysis is carried out in a diffusion dializer having a neutral membrane.

4. A process according to claim 1 wherein said electrodialysis is carried out by contacting said waste liquid with said recovering liquid countercurrently.

5. A process according to claim 2 wherein said diffusion dialysis is carried out in a diffusion dializer having a neutral membrane.

* * * * *